(12) United States Patent
Thoms

(10) Patent No.: US 7,949,204 B2
(45) Date of Patent: May 24, 2011

(54) IMAGE SCALING INTERPOLATION FOR REDUCED PICTURES

(76) Inventor: Michael Thoms, Bietigheim-Bissingen (DE)

( * ) Notice: Subject to any disclaimer, the term of this patent is extended or adjusted under 35 U.S.C. 154(b) by 961 days.

(21) Appl. No.: 10/945,126

(22) Filed: Sep. 20, 2004

(65) Prior Publication Data

US 2005/0185859 A1 Aug. 25, 2005

(30) Foreign Application Priority Data

Sep. 30, 2003 (DE) .................. 103 45 278

(51) Int. Cl.
*G06K 9/32* (2006.01)
*G06K 15/02* (2006.01)
*H04N 1/393* (2006.01)

(52) U.S. Cl. ......... 382/298; 382/299; 382/300; 358/1.2; 358/451

(58) Field of Classification Search .................. 382/298, 382/299, 300; 358/1.2, 451
See application file for complete search history.

(56) References Cited

U.S. PATENT DOCUMENTS

| 6,252,576 | B1 | 6/2001 | Nottingham | |
| 7,155,069 | B2 * | 12/2006 | Ishizaka | 382/298 |
| 2003/0095723 | A1 * | 5/2003 | Ishizaka et al. | 382/298 |
| 2003/0215156 | A1 | 11/2003 | Rieger | |

FOREIGN PATENT DOCUMENTS

DE 102 21 389 12/2003
* cited by examiner

*Primary Examiner* — Bhavesh M Mehta
*Assistant Examiner* — Bernard Krasnic
(74) *Attorney, Agent, or Firm* — Laurence A. Greenberg; Werner H. Stemer; Ralph E. Locher

(57) ABSTRACT

A method for processing original images that are stored in the form of pixels and need to be output at a reduced scale, where all original pixels are weight-added, based upon area pixels. A mutual overlap ($g_i$) of the pixels is determined, and intensity values to be assigned to output pixels are a weighted arithmetic mean of intensity values ($S_i$) of the original pixels with their respective mutual overlaps as weighting factors.

4 Claims, 3 Drawing Sheets

IMAGE SCALING INTERPOLATION FOR REDUCED PICTURES

This application claims priority under 35 USC Section 119 by German application 103 45 278 8 filed Sep. 30, 2003

BACKGROUND OF THE INVENTION

The invention pertains to an image processing method and device for reproducing original images that are stored in the form of pixels at a different scale.

Images frequently need to be reproduced on output devices, such as monitors and printers, at a different scale relative to the original image, i.e., in enlarged or reduced form. The original image information is represented by intensity values that are stored at addresses of an electronic storage medium, and the addresses of the image intensity values are assigned to certain area elements of the image that are also referred to as pixels. It is common practice to store the intensity values of the individual pixels point-by-point in a row, with the rows being stored successively, i.e., in the form of a matrix of columns and rows. In a 1:1 reproduction, each pixel of the output device reflects the intensity value of the associated pixel of the original image. In the known Nearest Neighbor Interpolation method, only the intensity values of those area elements which spatially lie closest to the pixels of the output device are respectively utilized. When reproducing a reduced image, for example, at a scale of 1:2, with this interpolation method, only every fourth pixel of the original image would be reproduced, and the originally existing image information would not be utilized in its entirety.

This also applies, in principle, to known image processing methods of higher order, e.g., the bilinear interpolation or bicubic interpolation methods, in which the intensity values of the pixels of the output device are calculated in a distance-weighted fashion relative to the spatial position of the original pixels. One common aspect of all these methods is that the stored intensity values for the pixels of the original image are processed in the form of raster points, and that the two-dimensional size of the pixels that corresponds to their physical reality is not part of the image information utilized. However, it has been recognized that an improved reproduction, by comparison to this known state of the art, can be achieved if the intensity values of the pixels are not processed in a distance-weighted, but rather in an area-weighted fashion.

SUMMARY OF THE INVENTION

Consequently, the invention is based on the objective of disclosing a method of the initially mentioned type that makes it possible to easily achieve an optimal and complete utilization of the original image information for any arbitrary two-dimensional configuration of pixels and any conversion scale. This objective is attained with the characteristics disclosed in the independent claim.

When reproducing reduced images, the invention provides the additional advantage that the signal/noise ratio of the respectively assigned pixels of the output image is significantly increased when processing noisy original images.

The invention, as well as other embodiments thereof defined in the dependent claims, are described in greater detail below with reference to the figures, wherein

DETAILED DESCRIPTION OF THE PREFERRED EMBODIMENT

Figures 1, 2:
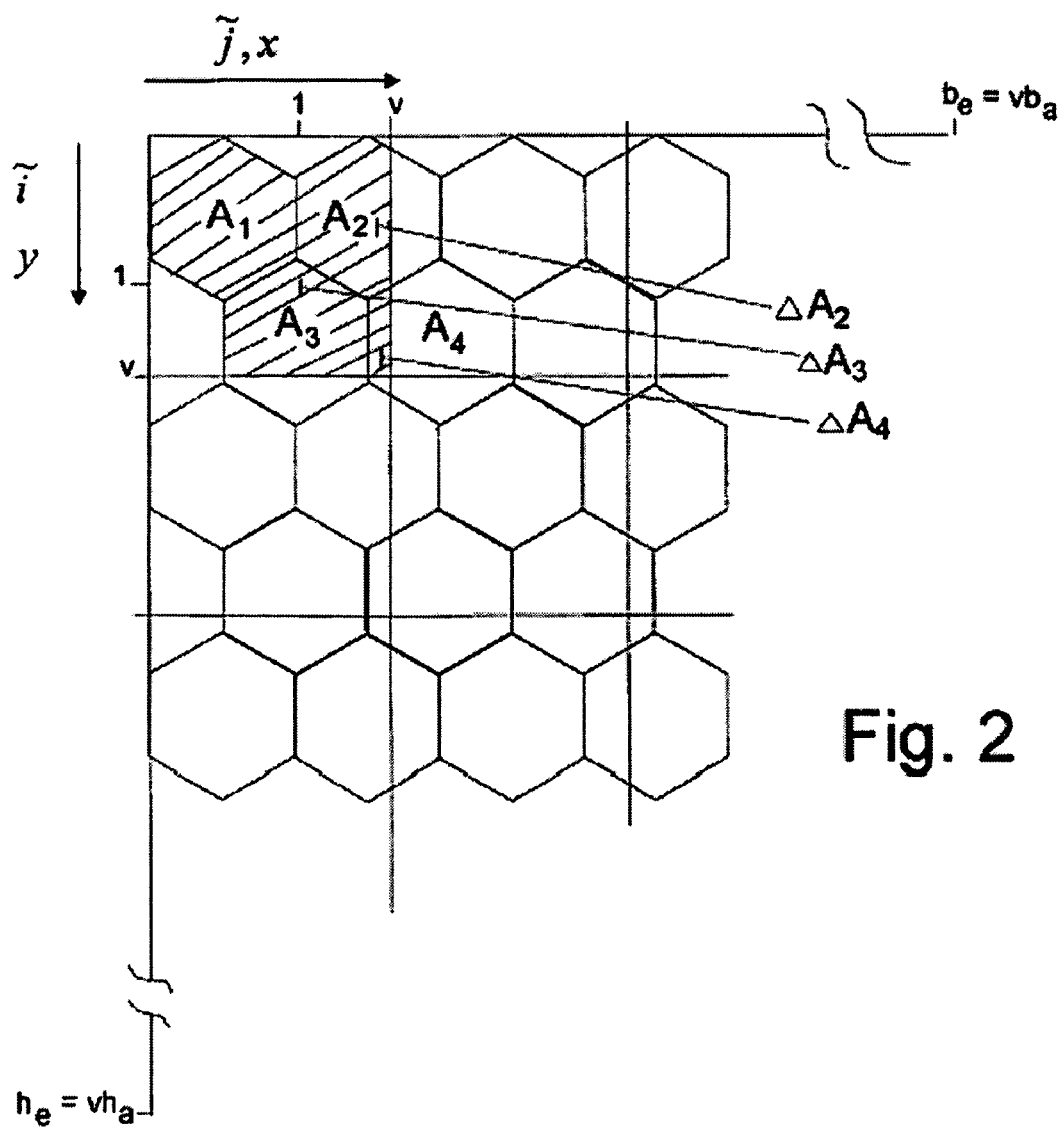
FIG. 1 shows image processing by means of the known Nearest Neighbor Interpolation method.
FIG. 2 shows the method according to the invention.

In the Nearest Neighbor Interpolation method indicated in FIG. 1, the reference symbols $S_{1,1}$ through $S_{4,4}$ identify intensity values that are assigned to the square pixels of an original image section and stored at individual memory addresses. If the image is reduced by a scale of 1:2 on a monitor or printer that also outputs the image with square pixels, only the hatched intensity values $S_{2,2}$, $S_{2,4}$, $S_{4,2}$, $S_{4,4}$ would be reproduced, i.e., ¾ of the total image information available would not be taken into account.

The method according to the invention is schematically illustrated in FIG. 2. In this example, the original image consists of adjoining honeycomb-shaped area elements (pixels), and the output device outputs square area elements with a side length v in the x-direction and in the y-direction. If be and he identify the width and the height of the original image and $b_a$ and $h_a$ identify the width and the height of the output device, the conversion factor for identical aspect ratios between the original and the output image is $v=v_x=b_e/b_a=v_y=h_e/h_a$ and a reproduction at the scale of 1:v is produced.

For example, the area element (pixel) in the upper left corner of the output device is initially discussed, wherein $\tilde{i}=1$ and $\tilde{j}=1$ apply to this area element. This area element overlaps the honeycomb-shaped areas of the original image that are identified by the reference symbols $A_1$ through $A_4$, with the respective degrees of mutual overlap being defined as $g_1=1$, $g_2=\Delta A_2/A_2$, $g_3=\Delta A_3/A_3$ and $g_4=\Delta A_4/A_4$. Stored intensity values $S_i$ are assigned to and correspond to the areas $A_i$ of the original image, and the weighted arithmetic mean is respectively determined for the intensity values $\tilde{S}_{\tilde{i},\tilde{j}}$ to be assigned to the individual pixels of the output device from these intensity values $S_i$, wherein the respective degree of overlap of the pixels is used as the weighting factor $g_i$. In the discussed example, this means $$\tilde{S}_{\tilde{i}=1,\tilde{j}=1} = \frac{g_1 S_1 + g_2 S_2 + g_3 S_3 + g_4 S_4}{g_1 + g_2 + g_3 + g_4} \qquad \text{Equation (1)}$$

$$= \frac{1}{\sum_{i=1}^{4} g_i}\left(\sum_{i=1}^{4} g_i S_i\right).$$

The above-described step is analogously repeated for the remaining pixels of the output device.

$$\sum_i g_i = v^2$$

always applies with respect to pixels of the output device that do not adjoin the edges, i.e., pixels that are entirely overlapped by area elements of the original image, where $v^2$ corresponds to the area of the output pixels.

If the original image consists of rectangular pixels and the output device also outputs rectangular pixels, the calculation of the signal intensities of the output pixels can be generally formulated in an algorithmic fashion as shown below:

$$\tilde{S}_{\tilde{i},\tilde{j}} = \frac{1}{v^2}\left(\sum_{i=1}^{ny}\sum_{j=1}^{nx} g_{\tilde{i},\tilde{j},i,j} S_{i,j}\right), \quad \text{Equation (2)}$$

where v is the conversion factor, $g_{\tilde{i},\tilde{j},i,j}$ is the area-related fraction of the i, j-th area element of the original image at the $\tilde{i},\tilde{j}$-th area element of the output device, and nx, ny refer to the number of columns and rows in the original image.

When reproducing a reduced image (v>1), it can be demonstrated that the method according to the invention makes it possible to process noisy original images such that the signal/noise ratio of the output pixels is significantly increased, i.e., improved. If an image is reproduced that is uniformly exposed to a mean N of roentgen photons per area element and in which each area element has a signal intensity $S_i=N$, a statistical noise $R_i=\sqrt{N}$ and consequently a signal/noise ratio $S_i/R_i=\sqrt{N}$, and in which the pixels of the input image are identified by the reference symbol i analogously to FIG. 2, the intensity of the output pixel, according to a generalization of equation (1), becomes $$\tilde{S}_{\tilde{i},\tilde{j}} = \left(\sum_i g_i S_i\right) / \sum_i g_i = N$$

and the corresponding signal/noise ratio, according to Gauss's law of errors propagation, becomes $$\tilde{S}_{\tilde{i},\tilde{j}} / \tilde{R}_{\tilde{i},\tilde{j}} = \sqrt{N}\left(\sum_i g_i / \sqrt{\sum_i g_i^2}\right). \text{ If } v > 1,$$

the value of the parenthetical term is always greater than one, and represents the factor by which the signal/noise ratio of the output image is improved by comparison to the original image. The following table lists these factors for different values of v in accordance with the specific image processing method.

| | Conversion factor v = | | | | | | |
|---|---|---|---|---|---|---|---|
| | 1.5 | 2 | 3 | 4 | 5 | 6 | 7 | 8 |
| Method according to the invention | 1.8 | 2 | 3 | 4 | 5 | 6 | 7 | 8 |
| Nearest Neighbor method | 1 | 1 | 1 | 1 | 1 | 1 | 1 | 1 |
| Bilinear interpolation | 1.6 | 2 | 1 | 2 | 1 | 2 | 1 | 2 |
| Bicubical interpolation | | 1 | ≦3 | 1 | ≦3 | 1 | ≦3 | |

According to this table, only the bilinear interpolation method makes it possible to achieve an improvement of the signal/noise ratio for v=2 that is the equivalent to that of the method according to the invention. In all other instances, the method according to the invention results in a less noisy reduction of the original images. This is of significant importance, e.g., with respect to medical X-ray images, because it enables the physicians to make a more precise diagnosis.

If in the original image and the output device rectangular or square area elements are present in which the widths and heights of the area elements are proportional to one another, the calculation of the signal intensities can be simplified, by comparison to the calculation of the signal intensities according to equation (2), as follows:

$$\tilde{S}_{\tilde{i},\tilde{j}} = \frac{1}{v^2}\left(\sum_{i=INT(v(\tilde{i}-1)+1)}^{RUND(v\tilde{i})} \sum_{j=INT(v(\tilde{j}-1)+1)}^{RUND(v\tilde{j})} g_{\tilde{i},\tilde{j},i,j} S_{i,j}\right). \quad \text{Equation (3)}$$

In this case, the sum of a smaller number of addends is formed. The function INT conventionally refers to the rounding off of the respective argument to the next integral value, while the function RUND used in the determination according to the invention is defined as RUND(a)=INT(a)+1−INT(1+INT(a)−a), where a represents the respective argument.

Figure 3:
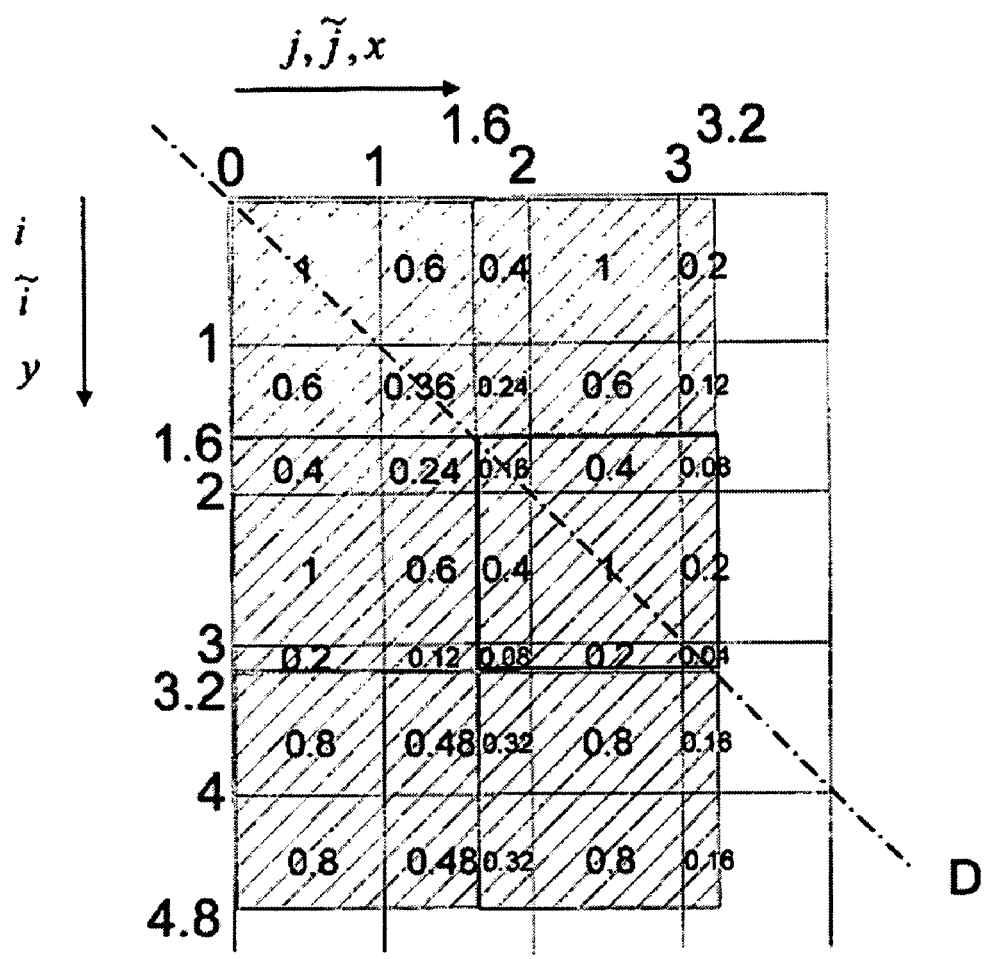
FIG. 3 shows a special variation of the method according to the invention.

FIG. 3 schematically shows the upper left corner region of an original image that is composed of square pixels, the side lengths of which respectively have the value 1. Also square pixels of the output device, which are indicated by hatching and the side lengths of which have the value 1.6 based on the conversion factor v=1.6 used (reduction scale 1:v=1:1.6), are assigned to these pixels in a scaled fashion. This means that each pixel of the output device overlaps several pixels of the original image to a certain degree that needs to be assigned to said pixels, and is illustrated as the weighting factor for the corresponding areas.

The weighting factors shown were calculated by determining the interval limits of the i, j-th area element of the original image indicated on the left and at the top as well as the $\tilde{i},\tilde{j}$-th area elements of the output device from the reduction scale, respectively calculating the overlap in the row direction and the column direction and forming the product thereof. This is described in greater detail below with reference to the pixel of the output device ($\tilde{i}=2, \tilde{j}=2$) that is bordered by a bold line in FIG. 3, and carried out analogously for all other area elements of the output device. At a reduction factor of v=1.6, the interval limits of this pixel lie at $v\cdot(\tilde{i}-1)=v=1.6$ and $v\cdot\tilde{i}=2v=3.2$ in the vertical direction and at $v\cdot(\tilde{j}-1)=v=1.6$ to $v\cdot\tilde{j}=2v=3.2$ in the horizontal direction. The weighting factors for the ranges $i=INT(v\cdot(\tilde{i}-1)+1)=2$ to $i=RUND(v\cdot\tilde{i})=4$ and $j=INT(v\cdot(\tilde{j}-1)+1)=2$ to $j=RUND(v\cdot\tilde{j})=4$ are now calculated. This means that only the weighting factors g with the indices i=2, 3, 4 and j=2, 3, 4 need to be calculated in the chosen example. Row vectors and column vectors $z_i$ and $s_j$ are calculated that contain the overlap of this area element of the output device in the row direction and in the column direction. The first element of the column vector contains the value $s_{INT(v\cdot(\tilde{i}-1)+1)}=s_2=INT(v\cdot(\tilde{i}-1)+1)-v\cdot(i-1)$, the last element contains the value $s_{RUND(v\cdot\tilde{i})}=s_4=v\cdot\tilde{i}-(RUND(v\cdot\tilde{i})-1)$, and the element that lies in between has the value 1. Analogously, the first element of the line vector has the value $z_{INT(v\cdot(\tilde{j}-1)+1)}=z_2=INT(v\cdot(\tilde{j}-1)+1)-v\cdot(\tilde{j}-1)$, the last element has the value $z_{RUND(x\cdot\tilde{j})}=z_4=v\cdot\tilde{j}-(RUND(v\cdot\tilde{j})-1)$ and the element that lies in between has the value 1. This results in $s_2=2-1.6=0.4$, $s_3=1$, $s_4=3.2-3=0.2$ as well as $z_2=2-1.6=0.4$, $z_3=1$, $z_4=3.2-3=0.2$. The weighting factors resulting from these row and column factors are defined as $g_{\tilde{i},\tilde{j},i,j}=s_j z_j$, i.e., in an explicitly numerical fashion for the pixel in question, as shown below: $g_{2,2,2,2}=0.4\cdot0.4=0.16$ $g_{2,2,2,3}=0.4\cdot1=0.4$ $g_{2,2,2,4}=0.4\cdot0.2=0.08$ $g_{2,2,3,2}=1\cdot0.4=0.4$ $g_{2,2,3,3}=1\cdot1=1$ $g_{2,2,3,4}=1\cdot0.2=0.2$ $g_{2,2,4,2}=0.2\cdot0.4=0.08$ $g_{2,2,4,3}=0.2\cdot1=0.2$ $g_{2,2,4,4}=0.2\cdot0.2=0.04$.

These weighting factors are then used for calculating the reproduced signal intensity $\tilde{S}_{\tilde{i}=2,\tilde{j}=2}$ for the corresponding pixel of the output device in accordance with equation (3).

The signal intensities of the remaining pixels of the output device are determined analogously.

If the reduction factors consist of fractions of rational numbers, i.e., numbers with v=n/m in which n, m are natural numbers, as is the case with 1.6=8/5 in the example illustrated in FIG. 3, the weighting factors are respectively repeated after each m columns and n rows of the output device, and $g_{\tilde{i},\tilde{j},i,j}=g_{\tilde{i}+m,\tilde{j},i+n,j}$ as well as $g_{\tilde{i},\tilde{j},i,j}=g_{\tilde{i},\tilde{j}+m,i,j+n}$ apply. There also exist symmetries with respect to the straight horizontal line at i=n/2 and the straight vertical line at j=n/2, with said symmetries respectively leading to the relations $g_{\tilde{i},\tilde{j},n+1-i,j}=g_{\tilde{i},\tilde{j},i,j}$ and $g_{\tilde{i},\tilde{j},i,j}=g_{\tilde{i},\tilde{j},i,n+1-j}$. In addition, $g_{\tilde{i},\tilde{j},i,j}=g_{\tilde{j},\tilde{i},j,i}$ always applies due to the symmetry relative to the diagonal through the origin that is identified by the reference symbol D. Computation and storage expense can be significantly reduced with the aid of these relations.

Figure 4:
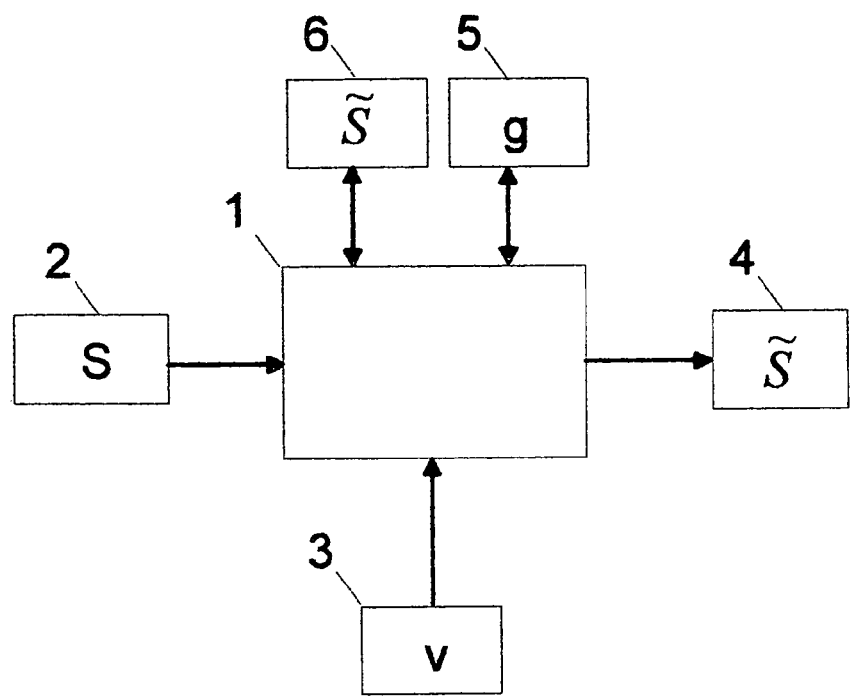
FIG. 4 shows a device for carrying out the method according to the invention.

FIG. 4 schematically shows a device for carrying out the method according to the invention*. A central processor unit 1 accesses an image memory 2 that contains the signal intensities S of the original image to be reproduced. The processor unit 1 initially calculates the weighting factors g and stores said weighting factors in a memory 5. Subsequently, the processor unit 1 calculates the signal intensities S̃ for the area elements of the output device 4, wherein the freely selectable conversion factor v to be used can be input by means of an input device 3. The signal intensities S̃ can be stored in an intermediate memory 6. The intermediate memory 6 is only required for instances in which the converted image needs to be output several times in succession. Otherwise, the signal intensities S̃ calculated by the processor unit are directly transferred to the output device 4. For instances in which the conversion factor v is an integer, the memory 5 could also be eliminated because the weighting factors g either have the value 1 or 0 in this case. This can be easily and quickly taken into account by the processor during the summation according to equation (3). This also applies to non-integer, real conversion factors v as long as the computing time is not subject to any strict requirements.

The invention claimed is:

1. A device for processing original images that are stored in a form of pixels and need to be output at a reduced scale, where all original pixels are weight-added, based upon area elements, comprising determining a mutual overlap ($g_i$) of the original pixels, and intensity values to be assigned to output pixels are calculated by a processor and comprise a weighted arithmetic mean of intensity values ($S_i$) of the original pixels with their respective mutual overlaps as weighting factors;
  memory that contains the intensity values of the original image;
  a central processor unit that accesses said memory and calculates the intensity values for an output device;
  said central processor unit being configured to calculate the intensity values for the output device using a conversion factor v that is no less than 3, and wherein the signal-to-noise ratio increases with an increase in the conversion factor, and the intensity values of the output pixels being determined by the central processor unit and utilized in accordance with a relation $$\tilde{S}_{\tilde{i},\tilde{j}} = \frac{1}{v^2}\left(\sum_{i=INT(v(\tilde{i}-1)+1)}^{RUND(v\tilde{i})} \sum_{j=INT(v(\tilde{j}-1)+1)}^{RUND(v\tilde{j})} g_{\tilde{i},\tilde{j},i,j} S_{i,j}\right)$$

taking into account a relation RUND(a)=INT(a)+1−INT(1+INT(a)−a) where INT(a) is a rounding off of a respective argument to a next integral value $S_{i,j}$, is the intensit values of the original image at the i, j-th area element, and $g_{\tilde{i},\tilde{j},i,j}$ is the mutual overlap of the i,j-th area element of the original image at the ĩ,j̃-th area element of the output device, said mutual overlap being defined as a ratio of the area of the i,j-th area element of the original image that overlaps the ĩ,j̃-th area element of the output device to the area of the i,j-th area element of the original image; and
  an input device for inputting the conversion factor.

2. The device according to claim 1, further comprising an intermediate memory for storing the weighting factors.

3. A method for processing original images that are stored in a memory in a form of pixels and need to be output by an output device at a reduced scale, where all original pixels are weight-added, based upon area elements, comprising determining a mutual overlap ($g_i$) of the original pixels, and intensity values to be assigned to output pixels are calculated by a processor and comprise a weighted arithmetic mean of intensity values ($S_i$) of the original pixels with their respective mutual overlaps as weighting factors;
  wherein v is a conversion factor that is no less than 3, and wherein the signal-to-noise ratio increases with an increase in the conversion factor, and the intensity values of the output pixels are determined and utilized in accordance with a relation $$\tilde{S}_{\tilde{i},\tilde{j}} = \frac{1}{v^2}\left(\sum_{i=INT(v(\tilde{i}-1)+1)}^{RUND(v\tilde{i})} \sum_{j=INT(v(\tilde{j}-1)+1)}^{RUND(v\tilde{j})} g_{\tilde{i},\tilde{j},i,j} S_{i,j}\right)$$

taking into account a relation RUND(a)=INT(a)+1−INT(1+INT(a)−a) where INT(a) is a rounding off of a respective argument to a next integral value, $S_{i,j}$, is the intensity values of the original image at the i, j-th area element, and $g_{\tilde{i},\tilde{j},i,j}$ is the mutual overlap of the i,j-th area element of the original image at the ĩ,j̃-th area element of the output device, said mutual overlap being defined as a ratio of the area of the i,j-th area element of the original image that overlaps the ĩ,j̃-th area element of the output device to the area of the i,j-th area element of the original image.

4. The method according to claim 3, wherein the original and output pixels are square or rectangular pixels of proportional width/height.

* * * * *